March 12, 1929. B. C. BRIDGHAM 1,704,879
COFFEE PERCOLATOR SEDIMENT COLLECTOR
Filed Jan. 4, 1928
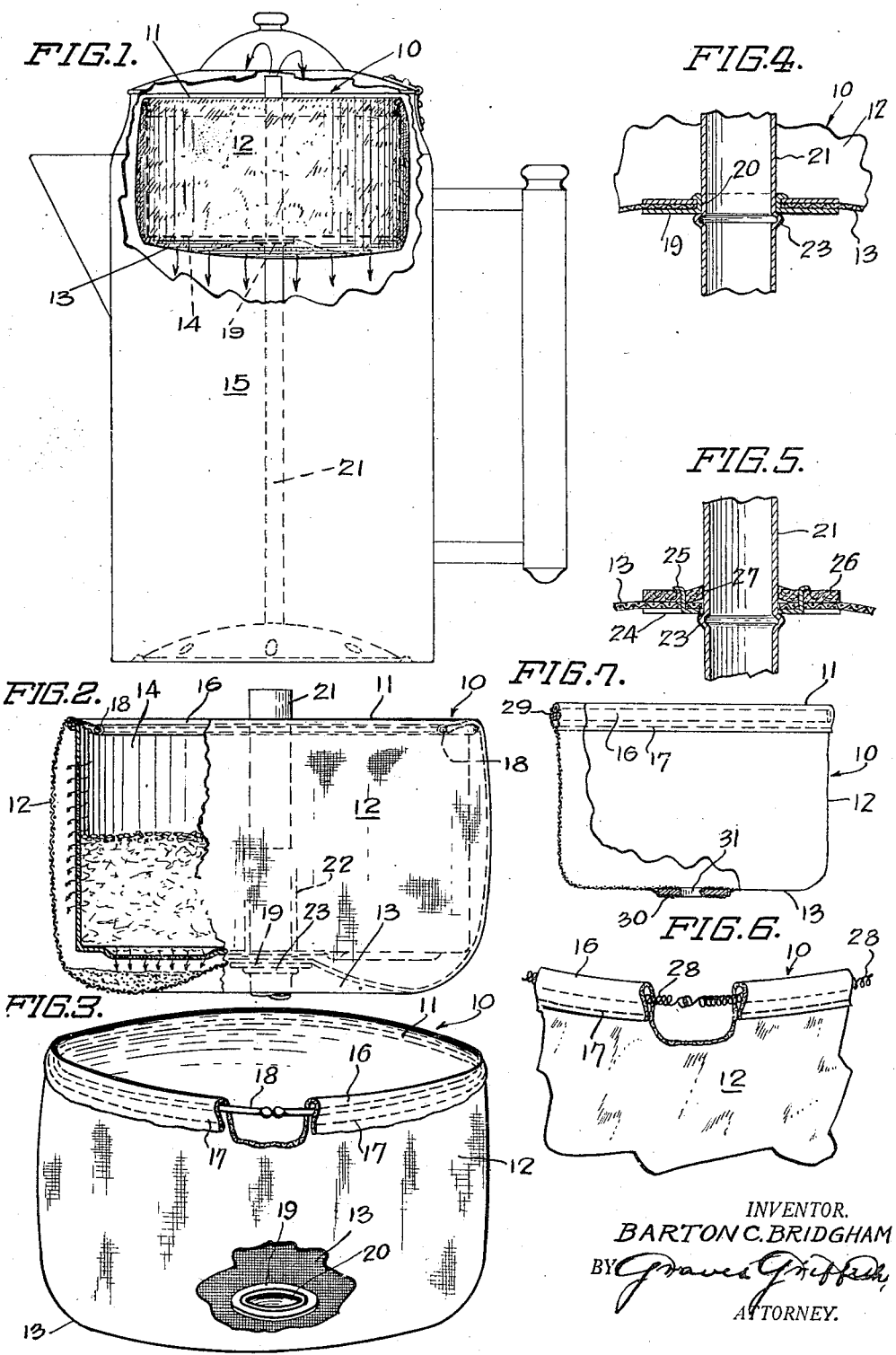
INVENTOR.
BARTON C. BRIDGHAM
BY
ATTORNEY.

Patented Mar. 12, 1929.

1,704,879

UNITED STATES PATENT OFFICE.

BARTON C. BRIDGHAM, OF OAKLAND, CALIFORNIA.

COFFEE PERCOLATOR SEDIMENT COLLECTOR.

Application filed January 4, 1928. Serial No. 244,396.

This invention relates to improvements in coffee percolator sediment collectors, and has for its primary object the provision of a simple, cheap, efficient and easily applied sack-like member adapted to envelop the percolator cup of an ordinary coffee percolator to form a strainer therefor for the collection of the finer coffee particles in the form of sediment that escapes with the coffee liquid through the fine perforations borne by the walls of the percolator cup, the removal of which from the coffee brew adds to both the appearance and palatableness of the beverage.

A further object of the invention is the provision of a simple and cheap sediment collector of the character designated, embodying as parts of its construction an upper contractile member having the property of drawing together, in puckered manner, the upper edge of the sack-like member over the upper edge of the percolator cup to cause it to be retained in suspended relation therewith, and a lower member of eyelet character borne centrally by the bottom of the sack member and adapted for the accommodation of the percolator tube or stem and to fit snugly thereabout for the prevention of infiltration therebetween of coffee sediments.

Other objects and advantages of the invention will be made to appear as this specification progresses, and be more fully brought out in the claims hereto appended.

In the accompanying drawings, forming a part of this specification, and in which similar reference characters refer to like parts, throughout:

Figure 1 is an elevation, illustrating an ordinary coffee percolator, portions of which are broken away to disclose the interior arrangement and the relation of the sediment collector to the percolator cup and its supporting hollow stem;

Figure 2 is an enlarged fragmental sectional detail of the percolator cup, in which is shown in connection therewith my improved sediment collector in readiness for use;

Figure 3 is a perspective view, in which the sediment collector is shown detached from the cup and is provided with a resilient puckering means and an eyeletted bottom for the accommodation of the cup supporting stem;

Fig. 4 is a sectional detail of the bottom eyelet of the sediment collector, as shown in Figures 1, 2 and 3;

Figure 5 is a view similar to that shown in Figure 4, except in that the eyelet is a modification of that there shown, being constituted of metal and felt, the latter being better adapted for the accommodation of the varying diameters of stems;

Figure 6 is a fragmentary detail illustrative of a modified form of puckering member of small coil spring character which is substituted for the split resilient spring member shown in Figures 1 to 3 inclusive; and Figure 7 is a view, partly in section, showing a sediment collector, in which the puckering means and eyelet consist of material of an elastic character.

Referring more particularly to the drawings, my improved sediment collector consists, preferably, of a closely woven thin material, such as linen or cotton, in the form of a sack 10 having an open upper end 11, a side section 12 and a bottom portion 13, the whole of a size to loosely envelop the percolator cup 14 of the coffee percolator 15.

The upper end 11 of the sediment collector is provided with a hem 16 held in place by a line of stitching 17 to form an enclosure about the upper edge of the sack to receive and retain a resilient puckering member 18, in this instance comprising a split steel wire ring having its ends slightly enlarged and normally abutting, as shown in Figure 3.

The bottom portion of the sack is provided with a centrally positioned eyelet 19 secured in place by riveting or other suitable means, as shown in Figure 4, the eyelet being adapted for the reception through its opening 20 of the cup supporting stem 21, about which it is fashioned to fit snugly.

In applying the sediment collector to the percolator cup, the member 18 is expanded sufficiently to so distend the mouth of the sack as to permit the sack to be slipped over the cup entirely enveloping it with the member 18 above the cup's edge, when the member will close drawing the sack's mouth together after the manner of a puckering string, thus securing the two in attached relation. As thus attached, with the eyelet opening 20 in register with the sleeve 22 of the cup, the two are placed upon the stem 21, after the manner employed ordinarily in placing the cup alone, and brought to rest upon the bead 23 usually borne by the stem.

It is to be observed, with reference to Figure 2, that, when my sediment collector is in attached co-operative relation with the cup 14 and the two in place upon the supporting stem, the percolative action is that of the ordinary percolator up to the filtration of the liquid through the usual cup perforations, these being of a character to arrest the coarser coffee grain particles but permitting freely the passage of the finer sedimentary portion, which is held in suspension by the liquid to be finally precipitated to the bottom of the percolator body proper, there to yield up additional alkaloid caffeine and caffetannic acid to the impairment of the beverage, where not intercepted. As here provided for, this objectionable sediment is received within the sack and held, permitting the liquid to drain through as a clear amber colored product possessed of such amount of alkaloid caffeine and caffeone or aromatic oil, only, as is necessary to a healthful palatable beverage.

Referring to Figure 5, in which a modified form of eyelet has been shown, it will be noted that the bottom of the sack 13 is provided with a metal disc 24 having an opening larger than the diameter of the stem 21, with the disc provided with prongs 25 extending through the bottom of the sack and penetrating a felt or like disc 26 adapted to secure this disc in place in the bottom of the sack, the latter having an opening 27 adapted for registration with the opening in the disc 24 and to adjust itself to the varying sizes in percolator stems to prevent filtration of sediment between stem and sack at this point.

In Figure 6 I have shown a modified form of puckering member, constituted of a very small coil spring 28 threaded through the hemmed upper edge of the sack and its free ends thereafter hooked together, as indicated.

If desired a rubber band 29 may be used for a draw or puckering means, as shown in Figure 7, the band in this instance being put in place previous to the stitching of the hem, as indicated, and the bottom provided with a rubber disc or gasket 30 secured in place and provided with an opening 31 adapted to accommodate itself snugly to stems of any size.

Having thus described my invention, I claim, and desire to secure by Letters Patent:

1. In a sediment collector of the character described, in combination with a percolator stem and its cup, of a sediment collector adapted to envelop said cup and provided with puckering means at its upper end adapted to pucker together said end about said cup's upper edge to sustain it in position thereon, and an eyelet formed in the bottom of said collector adapted to snugly embrace said stem.

2. In a sediment collector of the character described, the combination with a percolator stem and its cup, of a sediment collector in the form of a strainer adapted to envelop said cup and having its open end provided with a puckering member, said puckering member consisting of a resilient member adapted to normally contract the open end of said strainer to cause the same to be retained in place upon the cup, and an eyelet formed in the bottom thereof adapted to embrace and snugly fit said stem below the bottom of said cup.

3. In a sediment collector of the character described, the combination with a percolator stem and its cup, of a sediment collector therefor in the form of a sack adapted to loosely envelop said cup and having its open end provided with a puckering means adapted to normally contract said open end over the upper end of the cup, and a contractile eyelet formed in the bottom of the sack adapted to snugly embrace said stem below the cup to prevent leakage of sediment between stem and sack.

4. In a sediment collector of the character described, the combination with a percolator stem and its cup, of a sediment collector therefor in the form of a sack adapted to loosely envelop said cup, a hem formed upon the open edge of said sack providing space for the reception of a puckering means, a resilient puckering member disposed within said space and adapted to normally contract the open end of said sack to cause its retention upon said cup, and an eyelet centrally disposed in the bottom of said sack adapted to receive the upper end of said stem and to fit snugly thereabout to prevent leakage therebetween of sediment.

5. In a sediment collector of the character described, a sack adapted to loosely envelop the cup of a coffee percolator and having an open upper end and a closed bottom, a resilient puckering element secured in the open end thereof adapted to normally contract said open end over the upper edge of the percolator cup to retain it in place thereon, with its body and bottom forming a strainer spaced thereabout adapted for straining all sediment from the liquid coffee as received from said cup, and an eyelet formed centrally of the sack bottom adapted to receive and fit snugly the percolator stem and serve for the central support of said bottom.

In testimony whereof I hereby affix my signature this twenty-seventh day of December, 1927.

BARTON C. BRIDGHAM.